United States Patent [19]

Chejlava, Jr.

[11] Patent Number: 5,701,477
[45] Date of Patent: Dec. 23, 1997

[54] METHOD AND APPARATUS FOR MASTER BOOT RECORD SHADOWING

[75] Inventor: Edward John Chejlava, Jr., San Bruno, Calif.

[73] Assignee: Cirrus Logic, Inc., Fremont, Calif.

[21] Appl. No.: 413,234

[22] Filed: Mar. 30, 1995

[51] Int. Cl.$^6$ ............................................. G06F 9/06
[52] U.S. Cl. ............................................. 395/652
[58] Field of Search ................................. 395/651, 652, 395/653, 712

[56] References Cited

U.S. PATENT DOCUMENTS

| | | | |
|---|---|---|---|
| 5,136,711 | 8/1992 | Hugard et al. | 395/700 |
| 5,136,713 | 8/1992 | Bealkowski et al. | 395/700 |
| 5,210,875 | 5/1993 | Bealkowski et al. | 395/700 |
| 5,355,498 | 10/1994 | Provino et al. | 395/700 |
| 5,410,699 | 4/1995 | Bealkowski et al. | 395/700 |
| 5,410,707 | 4/1995 | Bell | 395/700 |
| 5,418,918 | 5/1995 | Vander Kamp et al. | 395/375 |

*Primary Examiner*—Kevin A. Kriess
*Attorney, Agent, or Firm*—Kimberly G. Nobles; Roger W. Blakely, Jr.; Steven A. Shaw

[57] ABSTRACT

An apparatus and method of replacing the Master Boot Record with an installation code which retains compatibility with any disk partitioning or formatting utility that uses the system's BIOS to access the disk is disclosed. The Master Boot Record which is generally located on cylinder 0, head 0, sector 1 on a disk drive is replaced with a new BIOS loader and BIOS extension code. The BIOS loader determines the location in memory to load the new BIOS and updates the interrupt table. Upon completion of initialization, the new BIOS returns control to the BIOS Boot loader which requests the BIOS to load sector 1, head 0, track 0 to memory and then transfers control to it. The newly loaded BIOS extension redirects the request for this particular sector from 0/0/1 to the highest commonly available sector for cylinder 0 and track 0. Thereafter, all utilities which require access to the Master Boot Record will be transparently re-directed. The present system provides the advantage that non-standard partitioning or formatting utilities are not required and thus the need to update them is also relieved.

39 Claims, 7 Drawing Sheets

METHOD AND APPARATUS FOR MASTER BOOT RECORD SHADOWING

BACKGROUND OF THE INVENTION

1. Field of the Invention

The present invention relates generally to computer disk boot systems, and more particularly to an apparatus and method of providing a replacement Basic Input/Output System (BIOS) for disk drives not supported by standard BIOS, while maintaining compatibility with standard disk drive partitioning and formatting applications.

2. Description of the Related Art

The Basic Input/Output System (BIOS) of a computer contains the drivers, or software interfaces for hardware devices of the computer. These devices include the keyboard, the display, the printer, auxiliary devices such as the serial port, the computer's clock and the boot disk device. Part of the BIOS is built into each computer by the computer's manufacturer. This part of the BIOS is called the resident BIOS. It is also known as the Read Only Memory (ROM) BIOS because it is contained in ROM chips located on the computer system board. The ROM BIOS serves as an interface with the computer hardware; it controls the hardware devices installed in a computer. It also presents a standardized interface to application and operating system software.

The second part of the BIOS is nonresident; it is read into random access memory (RAM) from disk when the computer boots. The boot operation itself performs two functions. It runs a power-on self test (POST) of the computer and searches disk drives for an operating system. When these functions are complete, the boot operation begins the process of reading the operating system files from disk and copying them to a location in the computer's RAM. The Master Boot Record is read first, followed by the Disk Operating System (DOS) Boot Record. The transferred information constitutes the DOS Boot Record. The Master Boot Record is typically found in the same location on every formatted disk. The Master Boot Record is approximately 512 bytes and provides just enough code to initiate the loading of the operating system files. After the BIOS boot program has loaded the Master Boot Record into memory, the BIOS passes control to the DOS Boot Record by branching to the address of its first instruction. The DOS Boot Record takes control of the personal computer and loads the disk BIOS into RAM. After loading the disk BIOS, the DOS Boot Record is no longer required and is over written in RAM by other code.

The computer's operating system, which on most personal computers is MS-DOS, specifies a particular organization of data on a hard disk. To facilitate the storage and retrieval of data in an orderly manner, computer hard disks are typically organized in blocks called sectors. These sectors are located on the disk by a set of unique specifiers called cylinder (or track), head (or side) and sector number. In personal computers, cylinders are conventionally numbered from zero to the maximum allowed by a given disk; heads are numbered from zero to the maximum number for a given cylinder and sectors are numbered from 1 to the highest sector number for a given cylinder and head. This type of addressing is called Cylinder-Head-Sector (C/H/S) and is often abbreviated as 105/12/13 for cylinder 105, head 12, sector 13.

The boot sector on a floppy disk or in a partition on a hard disk consists primarily of a short machine language program that starts the process of loading the operating system into memory. FIG. 1 depicts the standard sector allocation used by DOS, OS/2, and most other operating systems for the first couple of heads on cylinder number 0. The "native" BIOS introduced by IBM in 1984 supported a hard disk which started the current convention of reading the cylinder 0, head 0, sector 1 from the first hard disk to boot the operating system. This sector (0/0/1) is known as the Master Boot Record and contains information regarding how the hard disk is divided into partitions and provides enough executable code to locate the partition that is marked as bootable. The first sector of that partition is copied to memory and then executed. The newly loaded sector is called the Boot Record and is different for each operating system used. Old versions of DOS (prior to version 3.0) started the partition at 0/0/2, but all DOS versions from 3.0 and up start the first partition at 0/1/1, leaving the bulk of cylinder 0, head 0 unused. In the example of FIG. 1, the Master Boot Record is located at 0/0/1, the DOS Boot Record at 0/1/1. The DOS Boot Record is located on 0/1/1 while the DOS File Allocation Tables ("FATs") and directories are located on 0/1/2 through 0/1/N. DOS data is located on 0/2/0 through 0/n/N.

However, conventional BIOS does not provide for more than 10 bits for the cylinder number, or 1024 cylinders. This is inadequate for drives with larger geometries (anything larger than 528 Mbytes). Thus, the aforementioned conventional technique of sector allocation can neither support large disks nor access disks on the secondary disk adapter. One approach in solving this problem includes the installation of proprietary hard disk BIOS as shown in FIG. 2. In this approach, disk loadable BIOS extensions use the normally unused space on track 0 to store code. Examples of products utilizing this approach include Disk Manager from OnTrack Systems, and DrivePro from Micro House. These products include their own installation program that completely replace the Master Boot Record with their own code which loads their BIOS extension at boot time. This code will also have to duplicate the functionality of the normal Master Boot Record that is usually written by MS-DOS' FDISK program.

As shown in FIG. 2, existing products permit a user to install a new hard disk BIOS onto existing machines by writing the BIOS to cylinder 0, head 0, sector 2 through sector 16. These products include utility programs which allow partitioning (normally done by FDISK) and formatting (normally done by MS-DOS' FORMAT program) of the hard disk. Although this technique facilitates the support of large disks and permits access to disks on the secondary disk adapter, they do not allow the normal DOS partitioning and formatting utilities to be used since the proprietary hard disk BIOS has written over the location where the Master Boot Record is generally recognized by most computers to reside. As a result, the BIOS extensions provided by this approach prevent the use of low-level disk management utilities such as FDISK and FORMAT.

There are other significant drawbacks to this approach. Whenever DOS is revised or some new operating system is released, new types of partition information may be included in the Master Boot Record's partition table, requiring revision of the installation program which loads the BIOS loader and extensions to be compatible. This method also requires the use of the same install program to re-format or re-partition the hard disk.

Accordingly, there is a need in the technology for an apparatus and method for providing a replacement Basic Input/Output System (BIOS) for disk drives not supported by standard BIOS, which can support large disks or access disks on a secondary disk adapter while maintaining compatibility with standard disk drive partitioning and formatting applications.

BRIEF SUMMARY OF THE INVENTION

An apparatus and method of replacing the Master Boot Record with an installation code which retains compatibility with any disk partitioning or formatting utility that uses the system's BIOS to access the disk is disclosed. The Master Boot Record which is generally located on cylinder 0, head 0, sector 1 on a disk drive is replaced with a new BIOS loader and BIOS extension code. The BIOS loader determines the location in memory to load the new BIOS and updates the interrupt table. Upon completion of initialization, the new BIOS returns control to the BIOS boot process which requests the BIOS to load sector 1, head 0, track 0 to memory and then transfers control to it. The newly loaded BIOS extension redirects the request for this particular sector from 0/0/1 to the highest commonly available sector for cylinder 0 and track 0. Thereafter, all utilities which require access to the Master Boot Record will be transparently re-directed. Specifically, when a utility that performs partitioning is run after the BIOS is loaded, it will instruct the BIOS to read sector 0/0/1. The new BIOS will redirect it to the highest commonly available sector for cylinder 0 and track 0 (sector 17 in a personal computer), which the utility for partitioning can read and write without changing the actual Boot Loader. The present system provides the advantage that non-standard partitioning or formatting utilities are not required and thus the need to update them is also relieved. The present system also allows new versions of operating systems to change the Master Boot Record without affecting the BIOS extensions.

DETAILED DESCRIPTION OF THE PREFERRED INVENTION

Figure 1:
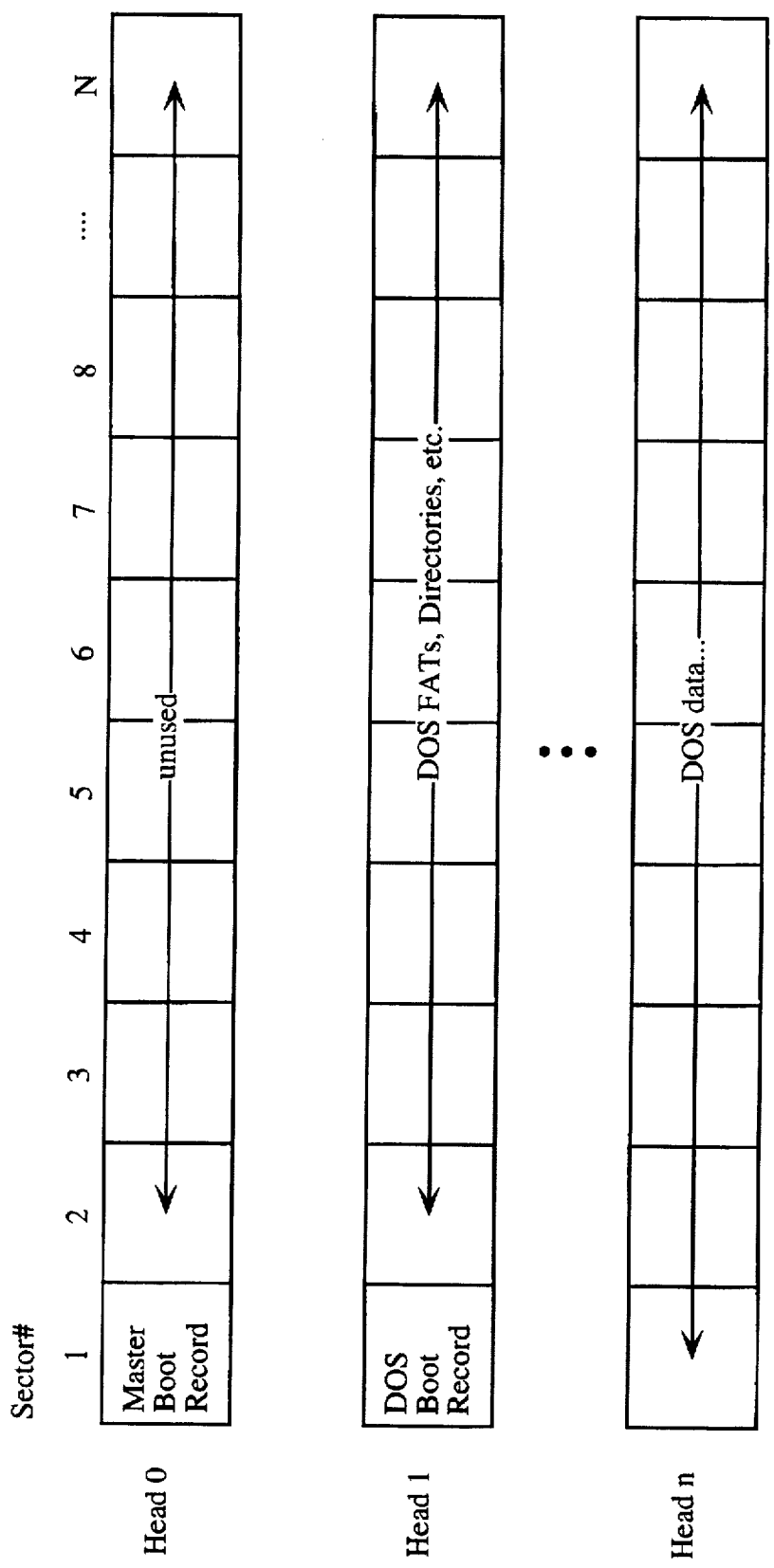
FIG. 1 is a diagram illustrating a conventional system of disk allocation.
Figure 2:
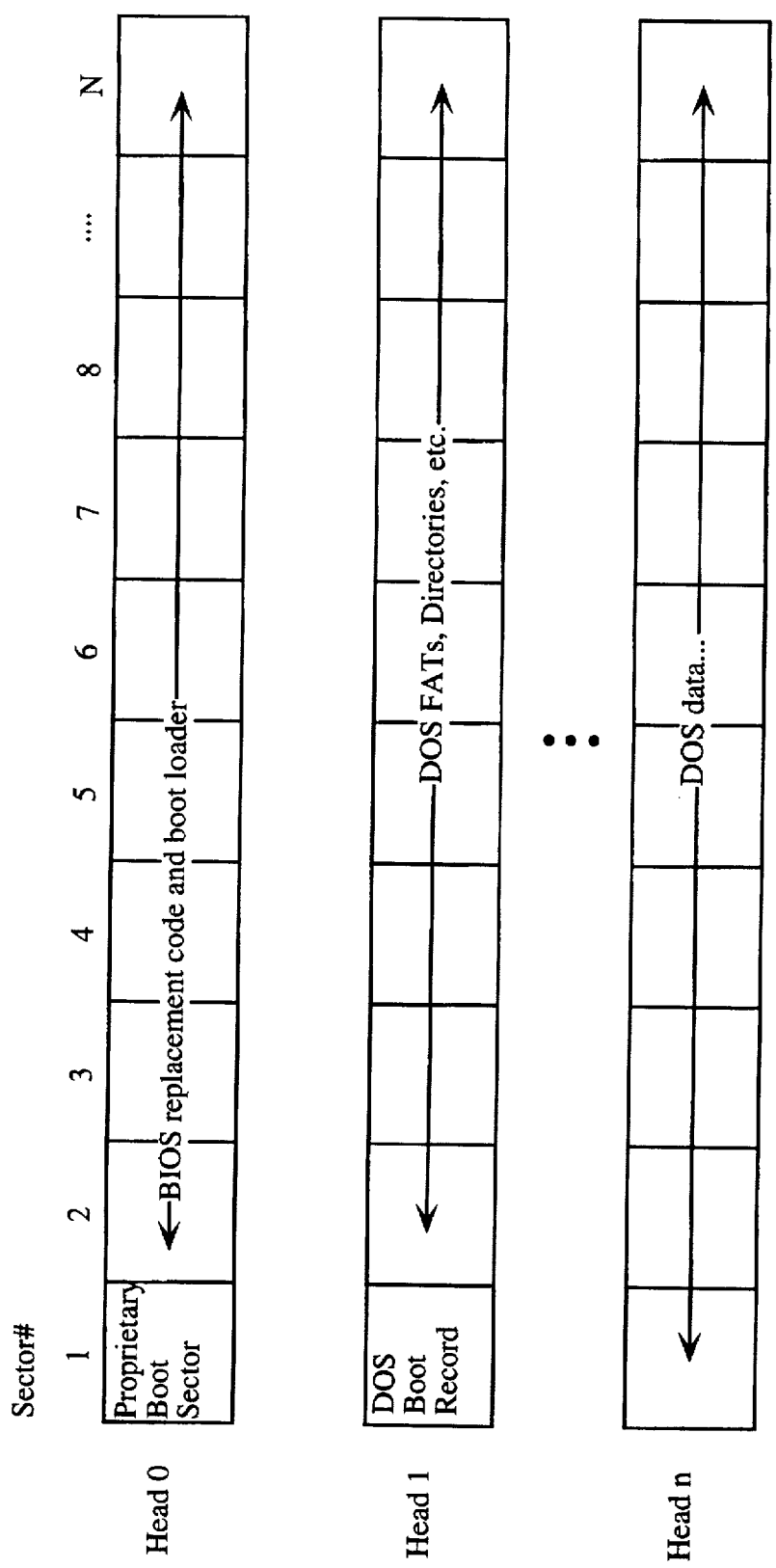
FIG. 2 is a diagram illustrating another conventional disk allocation system.

The present invention is an apparatus and method of utilizing the BIOS boot process to load the Master Boot Record which is generally located on cylinder 0, track 0, sector 1, to the highest commonly available sector for cylinder 0 and track 0 (sector 17 in a personal computer), and then to execute the initialization portion of that code. After initialization, the BIOS boot process is re-executed. The BIOS boot process makes a call to the newly replaced disk BIOS to read 0/0/1 into memory at a specified location and passes control to that code. Since the new BIOS is now being used to access the disk when a request to read sector 0/0/1 is made, the request is transferred to cylinder 0, head 0, sector 17, where a copy of the Master Boot Record has been placed. Thereafter, all utilities which perform operations that require access to the Master Boot Record will be transparently re-directed to 0/0/17.

Figure 3:
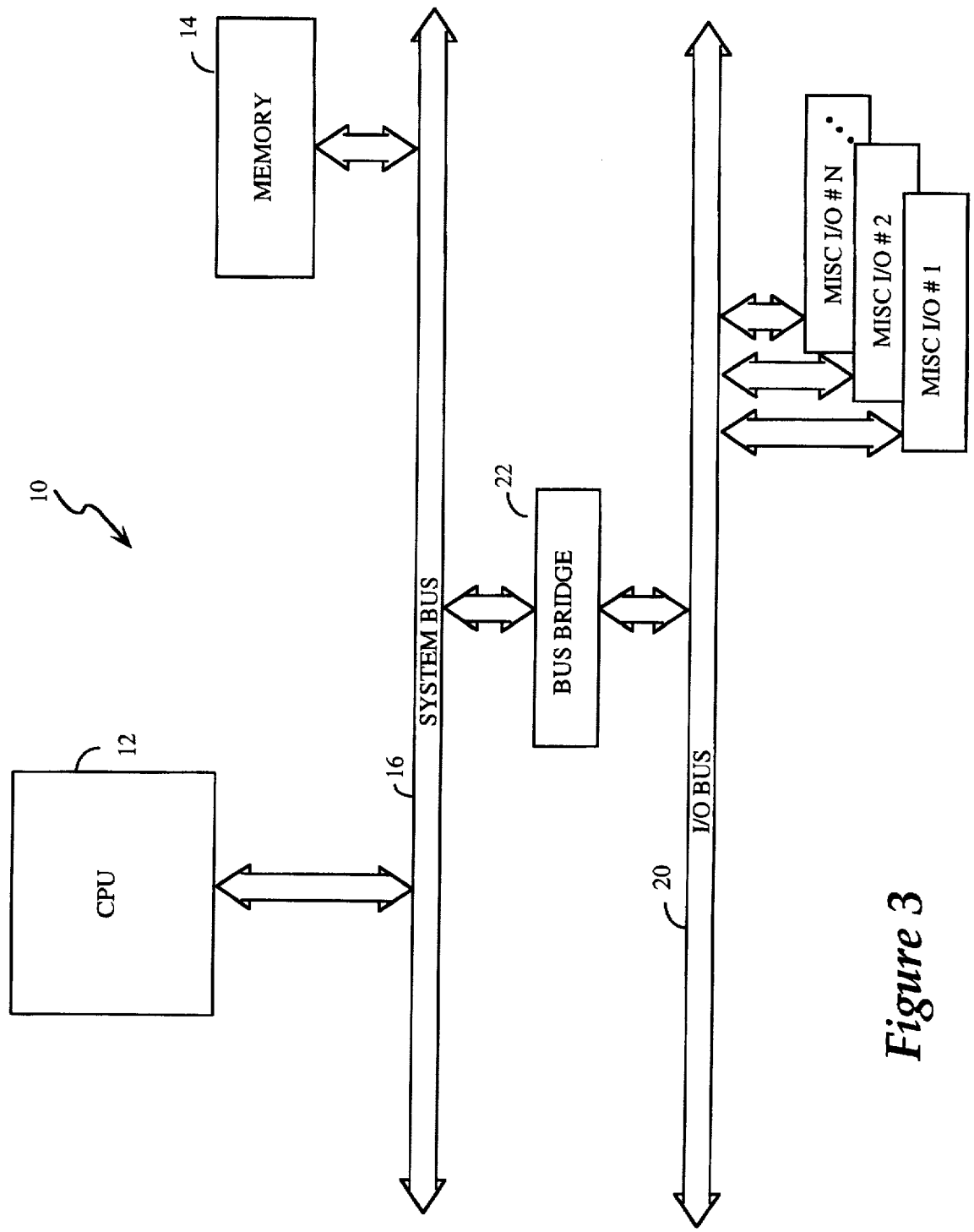
FIG. 3 is a system block diagram of an exemplary processor system in which the apparatus and method of the present invention is used.

The present embodiment is described in reference to a processor system 10 with a common bus, shared memory and resources. FIG. 3 illustrates a conventional processor system 10 which comprises a CPU 12 and a memory module 14. The CPU 12 and memory module 14 are coupled to a system bus 16. The processor system 10 may also include various I/O and peripheral modules (i.e., MISC I/O#1, MISC I/O #2, ..., MISC I/O #N) 18, which are coupled along an I/O bus 20. It should be understood, however, that further devices may be installed on the system bus 16 and on the I/O bus 20, as well-known in the art. Preferably, an Extended Industry Standard Architecture ("EISA") or an Industry Standard Architecture ("ISA") I/O bus may be used. A bus bridge 22 provides an interface between the system bus 16 and the I/O bus 20 to arbitrate the data flow between the peripheral devices and the system bus 16.

Figure 4:
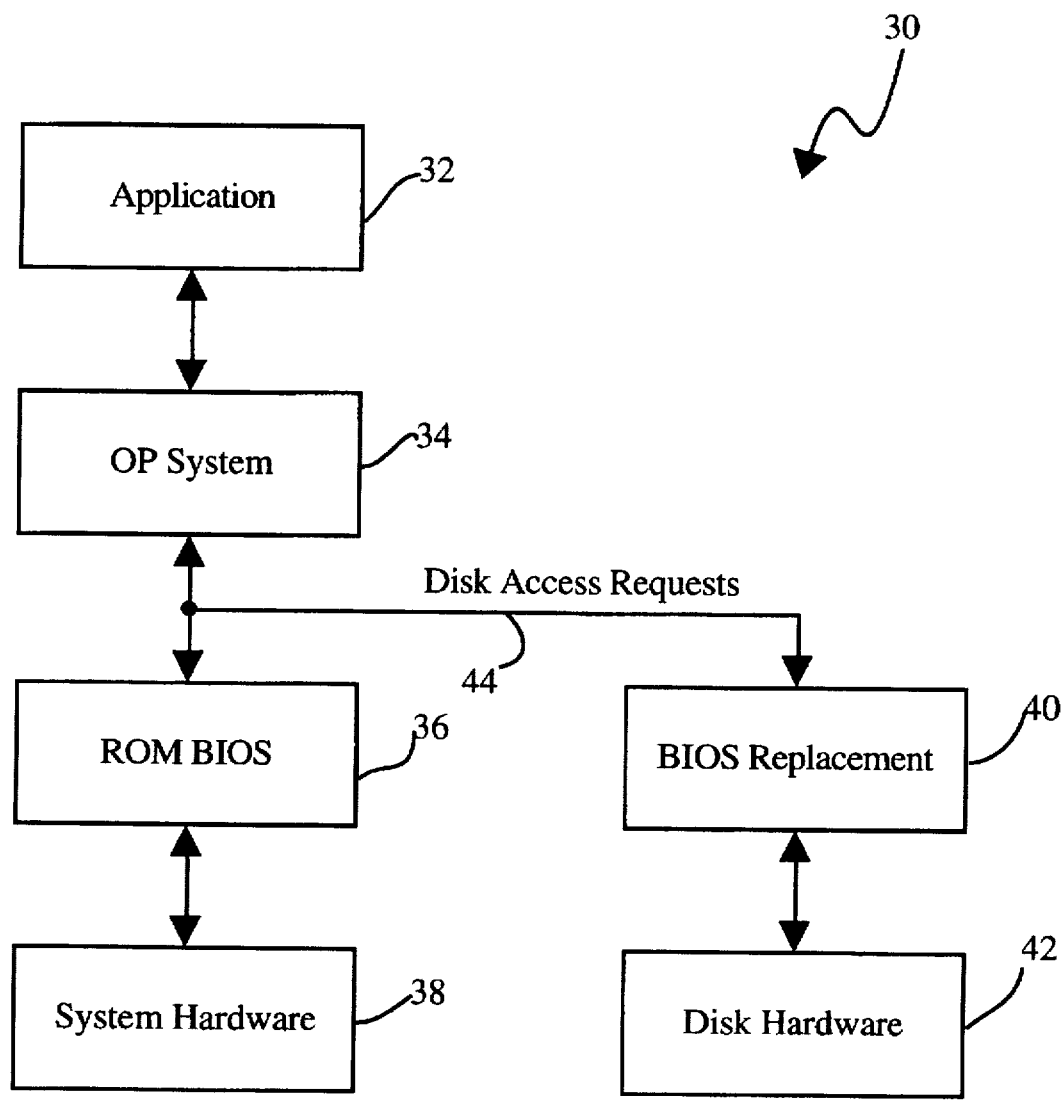
FIG. 4 is an overall functional block diagram illustrating the architecture of the system utilizing the apparatus and method of the present invention.

The present invention is also described in reference to an operating system installed on the processing system 10. FIG. 4 is an overall functional block diagram illustrating the architecture of a processing system 30 utilizing the apparatus and method of the present invention. The processing system 30 comprises an operating system 34 which support application programs 32, ROM BIOS 36 and system hardware 38. ROM BIOS 36 serves as an interface between system hardware 38 and the operating system 32. The processing system 30 also comprises the BIOS Replacement 40 which serves as an interface between disk hardware 42 and the operating system 34 and/or ROM BIOS 36. Disk access requests from ROM BIOS 36 or operating system 34 are provided to BIOS Replacement 40 via line 44.

The BIOS replacement 40 is loaded during booting of the computer system, before DOS is loaded. It is read into random access memory (RAM) from disk when the computer boots. In one embodiment, the hard disk drive in a computer system may first be prepared for use with the technique of the present invention and then booted accordingly. In an alternate embodiment, the computer system may be booted from a floppy disk after the BIOS replacement 40 has been loaded onto the computer system. The boot operation includes two functions: to run a power-on self test (POST) and to search drives for an operating system. When these functions are complete, the boot operation begins the process of reading the operating system files from disk and copying them to a location in the computer's RAM. The Master Boot Record is read first, followed by the DOS Boot Record. The transferred information constitutes the DOS Boot Record. The Master Boot Record is typically found in the same location on every formatted disk. After the BIOS boot program has loaded the Master Boot Record into memory, the BIOS passes control to the DOS Boot Record by branching to the address of its first instruction.

Figure 5:
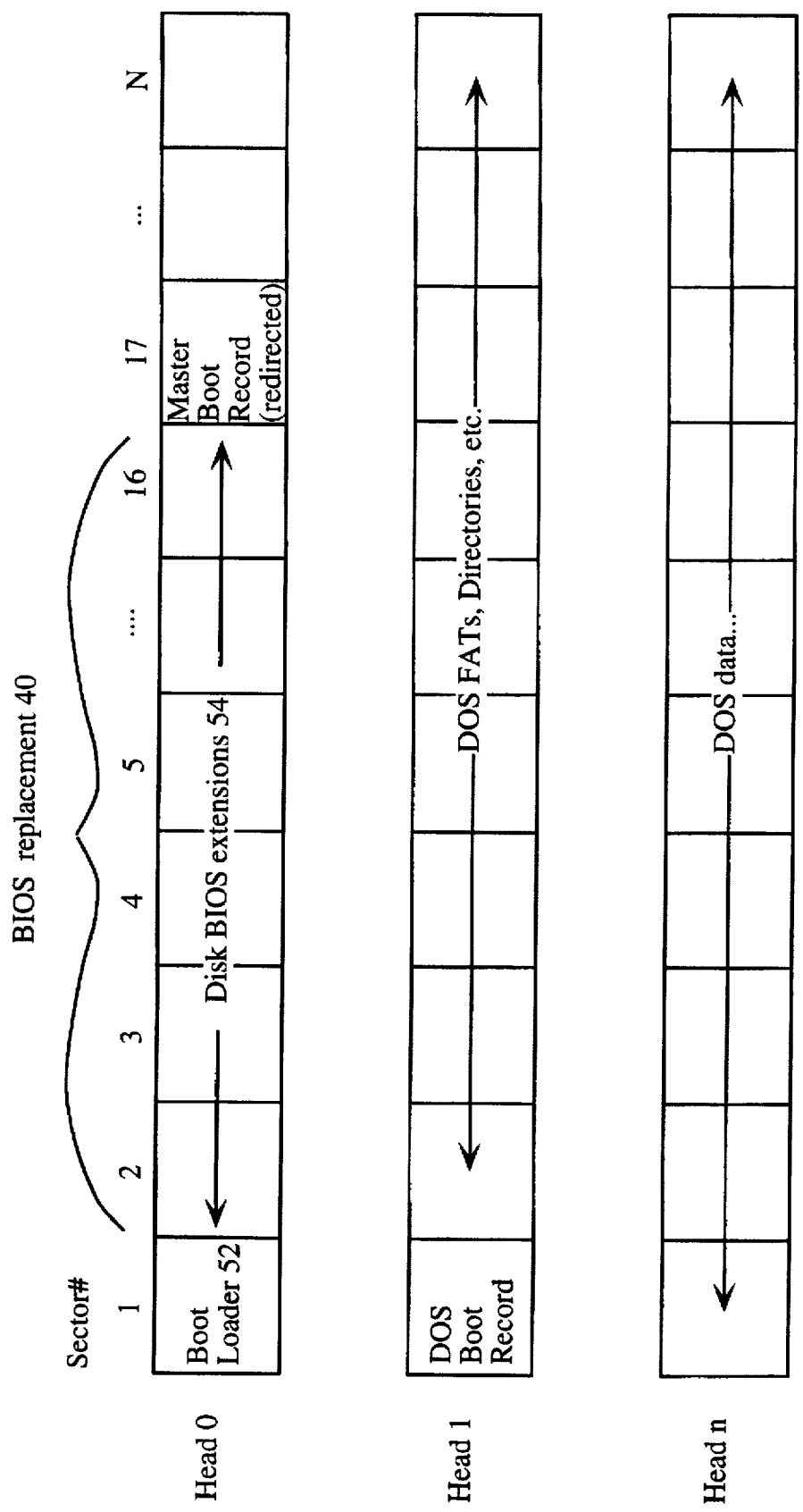
FIG. 5 is a diagram illustrating a preferred embodiment of the disk allocation technique of the present invention.

FIG. 5 is a diagram illustrating a preferred embodiment of the disk allocation system 50 of the present invention. The apparatus and method of the present invention replaces the Master Boot Record which is generally located on cylinder 0, head 0, sector 1 (0/0/1) of a disk drive with an installation code which retains compatibility with any disk partitioning or formatting utility that uses the system's BIOS to access the disk. Specifically, the method of the present invention first copies the Master Boot Record, which is located at 0/0/1 of the disk drive, to the highest available sector for cylinder 0 and track 0. The method of the present invention then replaces 0/0/1 of the disk drive, which is normally where Master Boot Record is located, with a new BIOS loader 52 which loads the Disk BIOS extensions 54 into memory and initializes the Disk BIOS extensions 54. The Disk BIOS extensions 54 thus constitute the BIOS replacement 40, since it provides the functionalities of the BIOS program it has replaced. As is known in the technology, all BIOS services are accessed through software interrupts. Each software interrupt instruction selects a particular entry in the interrupt vector table in low memory. The addresses of all BIOS service routines are stored in this table. This design makes it possible for a program to request a service without knowing the specific memory location of the BIOS service routine. Thus when the new BIOS loader 52 initializes the Disk BIOS extensions 54, the new BIOS loader 52 replaces the affected interrupt vectors in the interrupt table with addresses pointing to the routines of the replacement Disk BIOS extensions 54. Upon completion of initialization, new BIOS loader 52 transfers control back to ROM BIOS 36 (shown in FIG. 4). ROM BIOS 36 repeats the process of loading the Master Boot record from disk. Since the routine performed by ROM BIOS 36 utilizes the disk functions which were just replaced by the new BIOS loader 52, the functions provided by the Disk BIOS extensions 54 can now redirect the request for the Master Boot record from 0/0/1 to the highest commonly available sector for cylinder 0 and track 0. In personal computers, this sector is typically sector 17.

Thus, when a utility that performs disk partitioning is run after the Disk BIOS extensions 54 are loaded, it will use the Disk BIOS extensions 54 to access sector 0/0/1. The Disk BIOS extensions 54 will redirect this request to the highest commonly available sector for cylinder 0 and track 0 (sector 17 in a personal computer), which the utility for partitioning can read and write without changing the Boot Loader 52. As a result, after the system is rebooted, the Disk BIOS extensions 54 are used to access sector 0/0/1. The Disk BIOS extensions 54 will redirect this request to 0/0/17. The Disk BIOS extensions 54 then load the redirected Master Boot Record which appears to be located 0/0/1 but which is really located at 0/0/17. It will then interpret any partitioning information present and boot the desired operating system. The present system provides the advantage that non-standard partitioning or formatting utilities is not required and thus the need to update them is also being relieved.

Figure 6A:
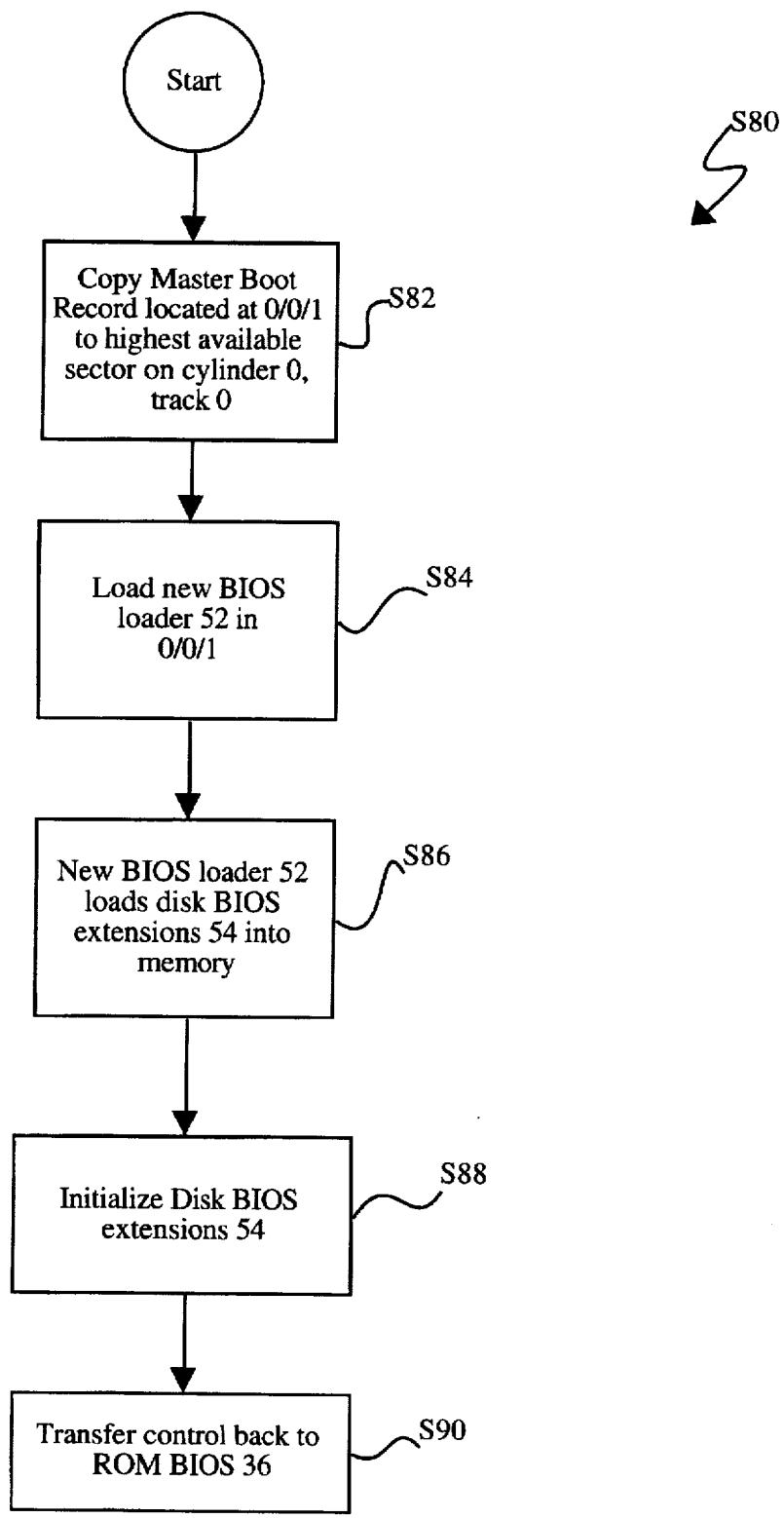
FIGS. 6A and 6B are flowcharts illustrating the process flow of a preferred embodiment of the disk allocation technique of the present invention.

FIGS. 6A and B are flowcharts illustrating a preferred embodiment of the disk allocation technique of the present invention. FIG. 6A illustrates the disk allocation process flow S80 of the method of providing the BIOS replacement 40 as described earlier. Beginning with a start state, process S80 first prepares the hard disk drive by copying the Master Boot Record located at 0/0/1 to the highest available sector for cylinder 0 and track 0 as shown in step S82. The process S80 then loads new BIOS loader 52 in 0/0/1, as depicted in step S84. The process S80 then proceeds to process step S86, where new BIOS loader 52 loads Disk BIOS extensions 54 into memory, as shown in process step S86. Control is then transferred to process step S88, where the Disk BIOS extension 54 routines are initialized. Process S80 then transfers control back to the ROM BIOS 36 boot process, as shown in process step S90. With the BIOS replacement 40 installed, the disk is now ready for use by other disk utilities.

Figure 6B:
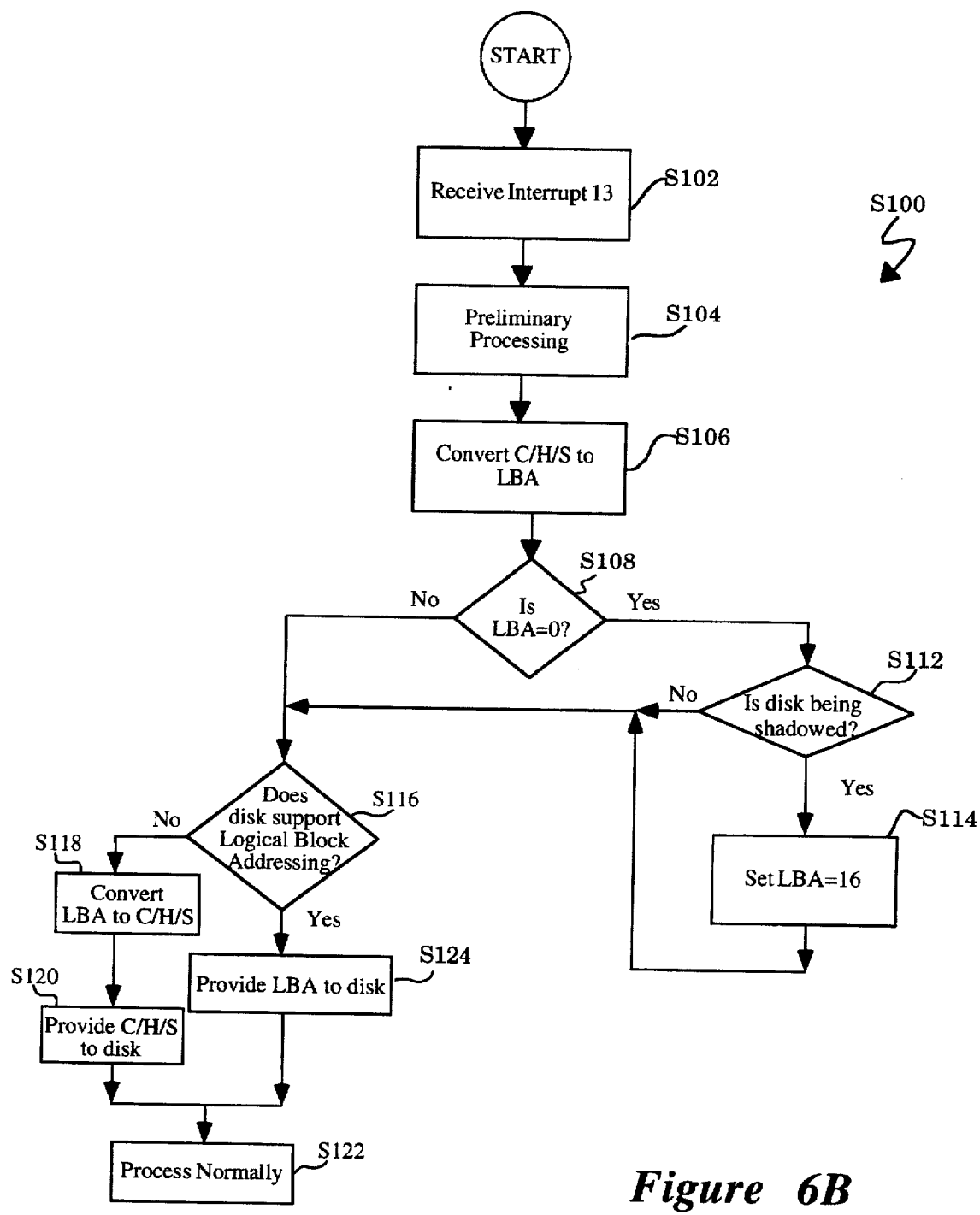

FIG. 6B illustrates the process flow S100 invoked when a utility that performs disk partitioning is run after the BIOS replacement 40 is loaded. As described earlier, when the utility is run, it will use the BIOS replacement 40 to attempt to access sector 0/0/1. The BIOS extensions 54 installed will redirect the utility to 0/0/17, as is described below. As is known in the technology, all BIOS services are invoked by interrupts. Also as known in the technology, all BIOS disk services are invoked by using interrupt 13H (decimal 19) and are selected by loading the service number into the AH register. The BIOS uses a set of descriptive parameter tables called disk-base tables to gain information about the capabilities of the disk controller hardware and the disk media.

Thus with reference to FIG. 6B, the process flow S100 of the method of providing the BIOS replacement 40 of the present invention begins when BIOS disk services are invoked through the receipt of Interrupt 13 as shown in S102. Upon receiving the Interrupt, preliminary processing is first performed, as shown in S104. The steps involved in preliminary processing include determining if the interrupt should be processed and identifying the drive requesting the request. The Cylinder/Head/Sector ("C/H/S") system is then converted to a Logical Block Addressing system as shown in S106. The use of a Logical Block Addressing system allows the operating system 34 to avoid dealing with the cylinder, head and sector numbers that vary among different types of disk-drive hardware. Here, the C/H/S values are converted to Logical Block Address ("LBA") values. The ANSI standard for converting from a C/H/S system to Logical Block Addressing system is provided on the Attachment Interface for Disk Drives X3.221 specification available from Global Engineering in Englewood, Colo. The process S100 then checks for an Logical Block Address ("LBA") that is equal to zero, as shown in decision step S108. If LBA is not equal to zero, the routine proceeds to the next process step which is decision step S116. However, if LBA is equal to zero (the Master Boot Record is at LBA 0), the process S100 determines if disk is being shadowed, as shown in step S112. If the disk is not being shadowed, which means that the Master Boot record does not have to be redirected, the process S100 transfers control to decision block S116.

Process step S112 is necessary because the Master Boot Record on disks that have been prepared on another system is located at sector 0 and not sector 17. In a preferred embodiment, the process S100 reads the first sector (0/0/1 or LBA=0) to determine if the new BIOS loader 52 is located at that sector. This is because certain hard drives have not been prepared by the process S80 which provides the BIOS replacement 40 to the system in use. If this is not the case, and the hard drive has been prepared for use with the method of the present invention, the BIOS loader 52 will be located at the first sector (0/0/1 or LBA=0), and the disk will be considered as being shadowed. The process S100 accordingly proceeds to process step S114. However, if this is not the case, the hard drive will not have been prepared for use with the method of the present invention. Thus, the new BIOS loader 52 is not located at the first sector (0/0/1 or LBA=0). The disk drive system will be considered as not being shadowed and the process S100 proceeds to the next process step. As a result, when the system boots up, the process S100 checks if the Master Boot Record had actually been relocated to sector 17 (0/0/17 or LBA=16). If the disk drive system is being shadowed, LBA is set to 16 (this is equivalent to 0/0/17) as shown in S114. If the hard disk was not previously prepared through the process S80, the system may be booted from a floppy disk after the BIOS replacement 40 has been loaded. In either case, requests for the Master Boot Record are redirected to sector 17 (0/0/17 or LBA=16), or to the highest sector available on cylinder 0 and track 0. It should be noted that this sector may be any predetermined sector selected by the person installing the BIOS replacement 40, and need not even be on cylinder 0 or head 0.

The process S100 then proceeds to determine if the disk drive system supports Logical Block Addressing, as shown in decision block S116. If not, the LBA values are converted to C/H/S, as depicted in S118. Specifically, the LBA=16 is translated to 0/0/17. The C/H/S value, i.e., 0/0/17 is then provided to disk drive system, as shown in S120. Thereafter, the process S100 returns to normal processing, as shown in S122. If the disk drive system supports LBA, the LBA value, i.e., LBA=16, is provided to the disk drive system, as shown in S124. The process then returns to normal processing, as shown in S122.

Through the use of the present invention, non-standard partitioning or formatting utilities are not required and thus the need to update them is also eliminated. The present system also allows new versions of operating systems to change the Master Boot Record without affecting the BIOS extensions. In addition, the present invention provides virus detection. There are a number of software viruses that write directly to disk hardware and thus can overwrite a portion of the standard boot loader if the disk is infected. Since the boot loader code of the present invention is larger than the normal Master Boot Record loader, when the virus is written into sectors 2 through the highest available sector on head 0, it is actually corrupting the loader of the present invention. As a result, when the system reboots, the virus will cause a system failure, thus indicating the user immediately of an infection.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An apparatus for providing a Basic Input/Output System extension routine, comprising:
   a memory for storing instruction sequences by which the Basic Input/Output System is processed, the memory including a Read Only Memory Basic Input/Output System;
   a disk system for storing information used by the Read Only Memory Basic Input/Output System to boot an operating system; and
   a processor for executing the stored instruction sequences;
   wherein the stored instruction sequences include process steps to cause the processor to: (a) transfer the Master Boot Record from a first location on the disk system to a second location on the disk system, wherein the first location is different from the second location, (b) load a plurality of Basic Input/Output System extension routines from the disk system into the memory; and (c) replace a plurality of interrupt vectors in an interrupt table with addresses pointing to the plurality of Basic Input/Output System extension routines.

2. The apparatus of claim 1, wherein the instruction sequences further include the steps of (d) storing a Basic Input/Output System loader at the first location and the Basic Input/Output System extension routines at succeeding locations on the disk system, (e) loading the Basic Input/Output System loader, (f) executing the Basic Input/Output System loader so as to read the Basic Input/Output System extension routines from the disk system into memory, and (g) transferring control to the Read Only Memory Basic Input/Output System to perform a boot process, wherein steps (d)–(g) occur prior to steps (a)–(c).

3. The apparatus of claim 1, wherein data on the disk system is organized by cylinder, head and sector numbers.

4. The apparatus of claim 1, wherein the instruction sequences include the step of converting data on the disk system to a logical block addressing system prior to step (h).

5. The apparatus of claim 4, wherein the process step (h) includes the steps of: (i) determining if the logical block address of the disk system is zero, (ii) proceeding to step (i) if the logical block address is not zero, (iii) if the logical block address is zero, determining if a request to access the Master Boot Record has to be redirected to the second location, (iv) if the request does not have to be redirected, proceeding to step (i), and (v) if the request has to be redirected, to set the logical block address to the address of the second location and then proceeding to step (i).

6. The apparatus of claim 5, wherein the instruction sequences include the following process steps which occur after step (a) but prior to proceeding to step (i): (i) determining if the disk system supports logical block addressing, (ii) if not, converting the logical block address to cylinder, track and sector numbers, and then providing the cylinder, track and sector numbers to the disk system, and thereafter proceeding to step (i), and (iii) if the disk supports logical block addressing, providing the logical block address to the disk system.

7. The apparatus of claim 2, wherein the Basic Input/Output System loader is loaded in cylinder 0, track 0 and sector 1 of the disk system.

8. The apparatus of claim 2, wherein the Basic Input/Output System extension routines are located on cylinder 0, track 0, sector 2 through a sector that is prior to the highest available sector on the disk.

9. The apparatus of claim 1, wherein the second location is a highest available sector on cylinder 0, track 0.

10. The apparatus of claim 9, wherein the highest available sector is sector 17.

11. The apparatus of claim 1, wherein the disk system is a hard disk drive.

12. The apparatus of claim 1, wherein the disk system is a floppy disk.

13. A method for providing a Basic Input/Output System extension routine, comprising the steps of:
   (a) transferring a Master Boot Record located at a first location on a disk system to a second location on the disk system, wherein the first location is different from the second location;
   (b) loading Basic Input/Output System extension routines from the disk system into memory; and
   (c) replacing a plurality of interrupt vectors in an interrupt table with addresses pointing to the plurality of Basic Input/Output System extension routines.

14. The method of claim 13, further including the following instruction steps of:
   (d) storing a Basic Input/Output System loader at the first location and the Basic Input/Output System extension routines at succeeding locations on the disk system;
   (e) loading the Basic Input/Output System loader;
   (f) executing the Basic Input/Output System loader so as to read the Basic Input/Output System extension routines from the disk system into memory; and
   (g) transferring control to a Read Only Memory Basic Input/Output System to perform a boot process, wherein steps (d)–(g) occur prior to steps (a)–(c).

15. The method of claim 13, wherein in step (a) data on the disk system is organized by cylinder, head and sector numbers.

16. The method of claim 15, further including the step of converting data on the disk system to a logical block addressing system prior to step (h).

17. The method of claim 16, wherein step (h) includes the steps of: (i) determining if the logical block address of the disk system is zero, (ii) proceeding to step (i) if the logical block address is not zero, (iii) if the logical block address is zero, determining if a request to access the Master Boot Record has to be redirected to the second location, (iv) if the request does not have to be redirected, proceeding to step (i), and (v) if the request has to be redirected, to set the logical block address to the address of the second location and then proceeding to step (i).

18. The method of claim 17, further including the following steps which occur after step (a) but prior to step (i): (i) determining if the disk system supports logical block addressing, ii) if not, converting the logical block address to cylinder, track and sector numbers, and then providing the cylinder, track and sector numbers to the disk system, and thereafter proceeding to step (i), and (iii) if the disk supports logical block addressing, providing the logical block address to the disk system.

19. The method of claim 14, wherein in step (e) the Basic Input/Output System loader is loaded in cylinder 0, track 0 and sector 1 of the disk system.

20. The method of claim 14, wherein in step (d) the Basic Input/Output System extension routines are located on cylinder 0, track 0, sector 2 through a sector that is prior to the highest available sector on the disk.

21. The method of claim 13, wherein in step (a) the second location is a highest available sector on cylinder 0, track 0.

22. The method of claim 21, wherein the highest available sector is sector 17.

23. The method of claim 13, wherein in step (a), the disk system is a hard disk.

24. The method of claim 13, wherein in step (a), the disk system is a floppy disk.

25. Computer-executable process steps for providing a Basic Input/Output System extension routine, the process steps including:

(a) transferring a Master Boot Record located at a first location on a disk system to a second location on the disk system, wherein the first location is different than the second location;

(b) loading Basic Input/Output System extension routines from the disk system into memory; and (c) replacing a plurality of interrupt vectors in an interrupt table with addresses pointing to the plurality of Basic Input/Output System extension routines.

26. Computer-executable steps of claim 25, further including the following steps of:

(d) storing a Basic Input/Output System loader at the first location and the Basic Input/Output System extension routines at succeeding locations on the disk system;

(e) loading the Basic Input/Output System loader;

(f) executing the Basic Input/Output System loader so as to read the Basic Input/Output System extension routines from the disk system into memory; and (g) transferring control to a Read Only Memory Basic Input/Output System to perform a boot process, wherein steps (d)–(g) occur prior to steps (a)–(c).

27. Computer-executable steps of claim 25, wherein in step a data on the disk system is organized by cylinder, head and sector numbers.

28. Computer-executable steps of claim 27, further including the step of converting data on the disk system to a logical block addressing system prior to step a.

29. Computer-executable steps of claim 28, wherein step (h) includes the steps of: (i) determining if the logical block address of the disk system is zero, (ii) proceeding to step (i) if the logical block address is not zero, (iii) if the logical block address is zero, determining if a request to access the Master Boot Record has to be redirected to the second location, (iv) if the request does not have to be redirected, proceeding to step (i), and (v) if the request has to be redirected, to set the logical block address to the address of the second location and then proceeding to step (i).

30. Computer-executable steps of claim 29, further including the following steps which occur after step (a) but prior to step (i): determining if the disk system supports logical block addressing, (ii) if not, converting the logical block address to cylinder, track and sector numbers, and then providing the cylinder, track and sector numbers to the disk system, and thereafter proceeding to step (i), (iii) if the disk supports logical block addressing, providing the logical block address to the disk system.

31. Computer-executable steps of claim 26, wherein in step (e) the Basic Input/Output System loader is loaded in cylinder 0, track 0 and sector 1 of the disk system.

32. Computer-executable steps of claim 26, wherein in step (d) the Basic Input/Output System extension routines are located on cylinder 0, track 0, sector 2 through a sector that is prior to the highest available sector on the disk.

33. Computer-executable steps of claim 25, wherein in step (a) the second location is a highest available sector on cylinder 0, track 0.

34. Computer-executable steps of claim 33, wherein the highest available sector is sector 17.

35. Computer-executable steps of claim 25, wherein in step (a), the disk system is a hard disk.

36. Computer-executable steps of claim 25, wherein in step (a), the disk system is a floppy disk.

37. The apparatus of claim 2, wherein the instruction sequences further include the steps of (h) accessing the Master Boot Record from the second location on the disk system, and (i) processing instructions stored in the Master Boot Record.

38. The method of claim 14 further including the steps of:

(h) accessing the Master Boot Record from the second location on the disk system; and (i) processing instructions stored in the Master Boot Record.

39. Computer-executable steps of claim 26 further including the steps of:

(h) accessing the Master Boot Record from the second location on the disk system; and (i) processing instructions stored in the Master Boot Record.

* * * * *

UNITED STATES PATENT AND TRADEMARK OFFICE
CERTIFICATE OF CORRECTION

PATENT NO. : 5,701,477
DATED : December 23, 1997
INVENTOR(S) : Cheijlava, Jr.

It is certified that error appears in the above-identified patent and that said Letters Patent is hereby corrected as shown below:

In column 10, claim 28, at line 4, please delete "claim 27" and insert --claim 39--.

Signed and Sealed this

Twenty-fifth Day of May, 1999

Attest:

Q. TODD DICKINSON

*Attesting Officer*   Acting Commissioner of Patents and Trademarks